United States Patent
Aoki et al.

(10) Patent No.: US 7,847,229 B2
(45) Date of Patent: Dec. 7, 2010

(54) OBJECT DETECTING SYSTEM

(75) Inventors: Hiroshi Aoki, Tokyo (JP); Masato Yokoo, Tokyo (JP); Yuu Hakomori, Tokyo (JP)

(73) Assignee: Takata Corporation, Tokyo (JP)

( * ) Notice: Subject to any disclaimer, the term of this patent is extended or adjusted under 35 U.S.C. 154(b) by 969 days.

(21) Appl. No.: 11/705,010

(22) Filed: Feb. 12, 2007

(65) Prior Publication Data
US 2007/0189749 A1 Aug. 16, 2007

(30) Foreign Application Priority Data
Feb. 14, 2006 (JP) .............................. 2006-036760

(51) Int. Cl.
G01S 17/08 (2006.01)
G01J 1/32 (2006.01)
G01D 5/34 (2006.01)
B60R 21/015 (2006.01)

(52) U.S. Cl. ............... 250/205; 250/208.1; 250/221; 701/45

(58) Field of Classification Search ............ 250/221, 250/222.1, 205, 208.1; 382/104; 701/36, 701/45, 49; 348/140, 148
See application file for complete search history.

(56) References Cited

U.S. PATENT DOCUMENTS

| | | | |
|---|---|---|---|
| 6,252,240 B1 * | 6/2001 | Gillis et al. ............ | 250/559.38 |
| 6,441,363 B1 * | 8/2002 | Cook et al. ............ | 250/221 |
| 6,781,676 B2 * | 8/2004 | Wallace et al. ............ | 356/4.03 |
| 6,968,073 B1 | 11/2005 | O'Boyle et al. | |
| 7,358,473 B2 * | 4/2008 | Aoki et al. ............ | 250/205 |
| 2004/0040772 A1 * | 3/2004 | Ertl et al. ............ | 180/271 |
| 2004/0085448 A1 | 5/2004 | Goto et al. | |
| 2004/0153229 A1 | 8/2004 | Gokturk et al. | |
| 2005/0265014 A1 | 12/2005 | Matsui et al. | |
| 2006/0138759 A1 * | 6/2006 | Aoki et al. ............ | 280/735 |
| 2006/0186651 A1 * | 8/2006 | Aoki ............ | 280/735 |
| 2007/0187573 A1 * | 8/2007 | Aoki et al. ............ | 250/205 |
| 2007/0189749 A1 * | 8/2007 | Aoki et al. ............ | 396/106 |
| 2008/0048887 A1 * | 2/2008 | Aoki et al. ............ | 340/937 |

FOREIGN PATENT DOCUMENTS

| | | |
|---|---|---|
| EP | 1 039 314 A2 | 9/2000 |
| JP | 2003-294855 | 10/2003 |
| WO | WO 01/96147 A3 | 12/2001 |

* cited by examiner

Primary Examiner—John R Lee
(74) Attorney, Agent, or Firm—Foley & Lardner LLP

(57) ABSTRACT

An object detecting system, which is installed in a vehicle, uses a camera comprising an optical lens, a distance measuring image chip, and an illumination device to detect information about an object occupying a vehicle seat. The illumination device is sectioned into a plurality of illuminants, such as a first illuminant and a second illuminant, so that the light emitting modes of the illuminants are controlled to be changed individually.

18 Claims, 7 Drawing Sheets

OBJECT DETECTING SYSTEM

BACKGROUND

The present invention relates to an object detecting system to be installed in a vehicle and, more particularly, to a technology for detecting information about an object occupying a vehicle seat.

Conventionally, there are known various technologies for detecting information about an object occupying a vehicle seat by using a photographing mechanism such as a camera. For example, Japanese Patent Unexamined Publication No. 2003-294855 (which is incorporated by reference herein in its entirety) discloses a configuration of an occupant detecting apparatus in which a single camera arranged in front of a vehicle occupant is used to detect the position of the vehicle occupant.

SUMMARY

An exemplary embodiment relates to an object detecting system. The system comprises a light emitting mechanism which emits light toward an object occupying a vehicle seat and which is sectioned into a plurality of light emitting sections of which light emitting modes are individually controlled, a control mechanism to control the light emitting mechanism, a photographing mechanism including an optical lens and a distance measuring image chip, wherein light emitted from the light emitting mechanism and reflected by the object is incident on the distance measuring image chip through the optical lens and is focused into a focusing area of the distance measuring image chip, and a processing mechanism to derive information about the object from the focused image on the distance measuring image chip of the photographing mechanism.

Another exemplary embodiment relates to an operation device control system. The system comprises an object detecting system. The object detecting system comprises a light emitting mechanism which emits light toward an object occupying a vehicle seat and which is sectioned into a plurality of light emitting sections of which light emitting modes are individually controlled, a control mechanism to control the light emitting mechanism, a photographing mechanism including an optical lens and a distance measuring image chip, wherein light emitted from the light emitting mechanism and reflected by the object is incident on the distance measuring image chip through the optical lens and is focused into a focusing area of the distance measuring image chip, and a processing mechanism to derive information about the object from the focused image on the distance measuring image chip of the photographing mechanism. The system further includes an operation device which is operated based on the information about the object occupying the vehicle seat derived by the processing mechanism of the object detecting system and an actuation control mechanism to control the actuation of the operation device.

Yet another exemplary embodiment relates to a vehicle. The vehicle comprises an engine/running system, an electrical system, an actuation control device for conducting the actuation control of the engine/running system and the electrical system, and an object detecting mechanism for detecting information about an object occupying a vehicle seat. The object detecting mechanism comprises an object detecting system including a light emitting mechanism which emits light toward an object occupying a vehicle seat and which is sectioned into a plurality of light emitting sections of which light emitting modes are individually controlled, a control mechanism to control the light emitting mechanism, a photographing mechanism including an optical lens and a distance measuring image chip, wherein light emitted from the light emitting mechanism and reflected by the object is incident on the distance measuring image chip through the optical lens and is focused into a focusing area of the distance measuring image chip, and a processing mechanism to derive information about the object from the focused image on the distance measuring image chip of the photographing mechanism.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1A:
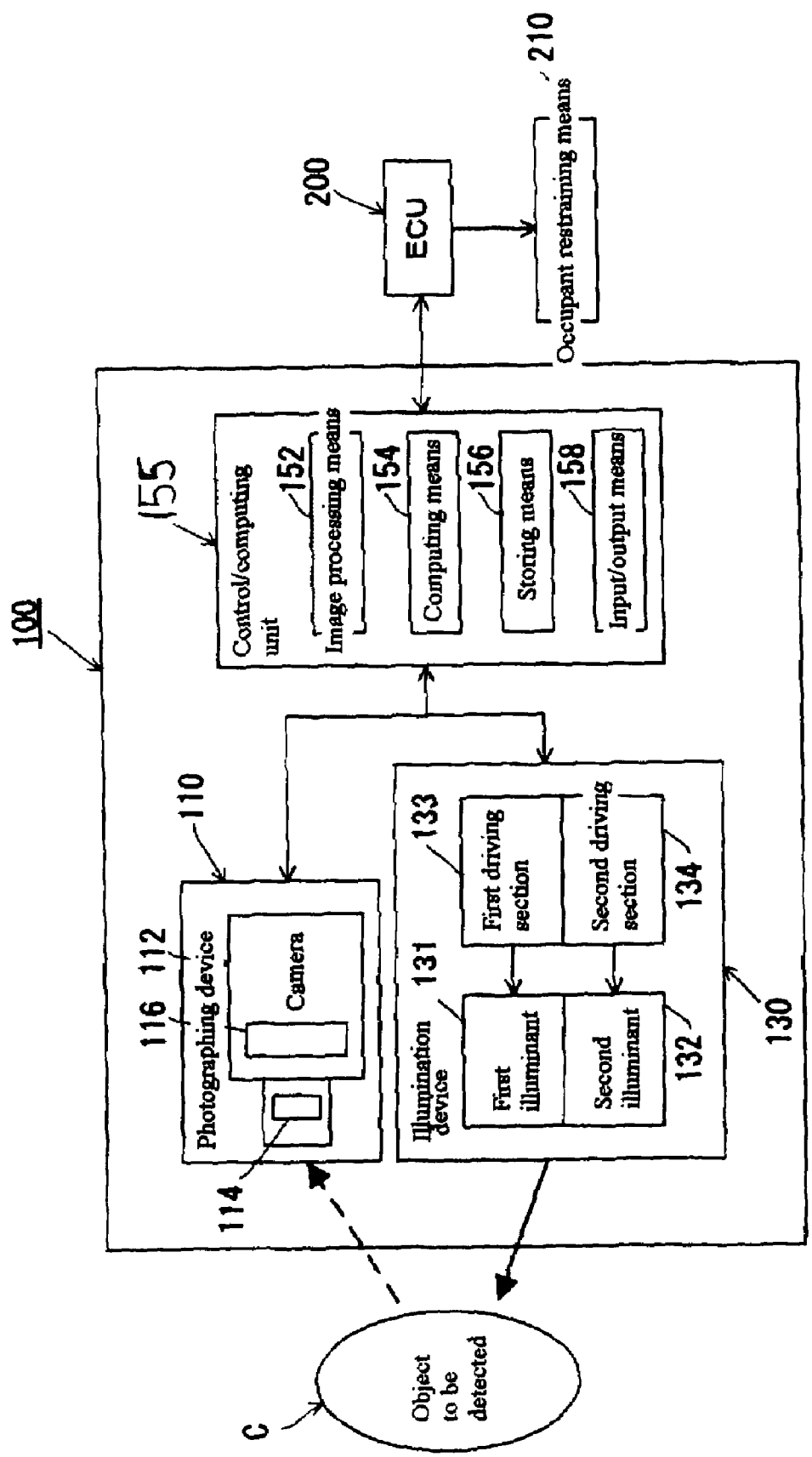
FIG. 1(a) is an illustration showing an object detecting system according to an embodiment which is installed in a vehicle.

In a case of using a camera to detect information about a vehicle occupant just like the occupant detecting apparatus disclosed in the aforementioned Japanese Patent Unexamined Publication No. 2003-294855, the quantity of light focused into a focusing area of an image chip through an optical lens is decreased at the peripheral area. This phenomenon becomes significant as the viewing angle of the camera is increased. In addition, the distortion of an image focused in the focusing area of the image chip is increased at the peripheral area as compared to the central area, thus deteriorating the accuracy of detection of the vehicle occupant. Particularly in the case of using a 3-D camera to detect information about distances relative to a vehicle occupant for the purpose of obtaining detailed information such as the position, posture, physical size, and motion of the vehicle occupant, there must be deterioration and variation in precision of detected distances relative to the vehicle occupant so that it is difficult to obtain desired information precisely. Accordingly, in designing the detecting system, an effective technology for detecting desired information of the object precisely is demanded.

Exemplary embodiments are made in view of the above, and it is an object of an embodiment to provide an effective technology for precisely detecting desired information of an object occupying a vehicle seat.

Though embodiments can be adapted to an object detecting system for detecting information about an object occupying a vehicle seat in an automobile, embodiments can also be adapted to a technology for an object detecting system in a vehicle other than an automobile, such as an airplane, boat, train, bus, and the like.

An object detecting system of a first embodiment is a system which detects information about an object occupying a vehicle seat and which comprises a light emitting mechanism, a control mechanism, a photographing mechanism, and a processing mechanism. The object used here can include a vehicle occupant, an object placed on a vehicle seat, a child seat, a junior seat, or any other suitable object on a vehicle seat. In addition, information about the object can include information about presence, size, position, distance, posture, motion of the object, and light emitting quantity (light distribution amount) and brightness relative to the object. When the object is a vehicle occupant, the information about the object can include the presence of a vehicle occupant, the size (physique class) of the vehicle occupant, position of the vehicle occupant, distances relative to the vehicle occupant, positions and configurations of body parts of the vehicle occupant, posture of the vehicle occupant, motion of the vehicle occupant, light emitting quantity (light distribution amount) relative to the vehicle occupant, and brightness relative to the vehicle occupant.

The light emitting mechanism is a mechanism for emitting light toward the object occupying the vehicle seat. Light emitting mechanisms are typically composed of various lamps. The light emitting mechanism is an illuminant for irradiating light to the object occupying the vehicle seat. The actuation of the light emitting mechanism can be controlled by a control mechanism.

The photographing mechanism comprises an optical lens and a distance measuring image chip. Light emitted from the light emitting mechanism and reflected by the object occupying the vehicle seat is incident on the distance measuring image chip through the optical lens and is focused into the focusing area of the distance measuring image chip. The optical lens can be formed by coupling a plurality of lenses. The distance measuring image chip is typically a CCD (charge-coupled device) chip in a 3-D camera capable of measuring distance relative to the object. Therefore, a 3-D camera may be employed as a photographing mechanism.

The processing mechanism is adapted to derive information about the object from the focused image on the distance measuring image chip of the photographing mechanism. The processing mechanism has an image processing function of controlling the camera to obtain good quality images and for controlling the image processing for processing the taken images for analysis and a storing function of storing (recording) an operation control software, data for correction, buffer frame memory for preprocessing, defined data for recognition computing, reference patterns.

In an embodiment, the aforementioned light emitting mechanism is sectioned into a plurality of light emitting sections of which light emitting modes are individually controlled. That is, the light emitting mechanism has such a structure that the control of the light emitting mode of each light emitting section can be conducted individually. The light emitting mode can include quantity of emitting light, time of turning on light, time of turning off light, and time and speed of blinking, and the like.

According to the structure as mentioned above, the light emitting mode of the light emitting section corresponding to an object desired to be detected or a light emitting section corresponding to a part desired to be detected among parts of the object can be individually set. Therefore, it is possible to precisely detect information about the object occupying the vehicle seat by using the photographing mechanism.

Information about the object detected by the object detecting system can be used for controlling an occupant restraining mechanism for restraining a vehicle occupant, such as an airbag device, a seat belt device, and a warning apparatus for outputting warning signals (display, sound and so on).

In the object detecting system of a second embodiment, the light emitting modes of the light emitting sections in the light emitting mechanism are controlled in such a manner that the quantity of incident light (sometimes called "quantity of reflected light") on the distance measuring image chip is equalized to the respective portions of the focusing area.

In the case of using the photographing mechanism as mentioned above to detect information about the object, it is known that the accuracy of detection of the vehicle occupant is deteriorated because of the following reasons. That is, the quantity of light focused into a focusing area of the distance measuring image chip through the optical lens is decreased at the peripheral area. This phenomenon becomes significant as the viewing angle of the camera is increased. In addition, the distortion of an image focused in the focusing area of the image chip is increased at the peripheral area as compared to the central area. Particularly, in the case of using a 3-D camera to detect information about distances relative to an object for the purpose of obtaining detailed information such as the position, posture, size, and motion of the object, there must be deterioration and variation in accuracy of detected distances relative to the object so that it is difficult to obtain desired information.

In exemplary embodiments, the light emitting modes of the light emitting sections are controlled to be changed such that the quantity of incident light on the distance measuring image chip is equalized to respective portions of the focusing area. This arrangement is achieved by varying the matrix density of light emitting lamps composing the respective light emitting sections or varying the light quantities and/or the light emitting patterns of the respective light emitting sections. The arrangement may be achieved when assembling this system into a vehicle or achieved by control of changing the light emitting modes based on detection results of information about the quantity of incident light. The equalization of the quantity of incident light used here can be a state that the quantity of light incident on the distance measuring image chip is in a predetermined suitable range at each of the respective portions of the focusing area. The only requirement is that the incident light quantities at the respective portions of the focusing area are substantially equal.

As mentioned above, there may be specific issues with optical lens such that the quantity of light focused into the focusing area of the distance measuring image chip through the optical lens is reduced at the peripheral portion and the accuracy of detection of the object is reduced depending on the position. The issues become significant as the viewing angle of the camera is increased. According to the structure of the object detecting system of the second embodiment, the problems can be solved by the arrangement of the light emitting sections. Therefore, it is possible to precisely detect information about the object occupying the vehicle seat by using the photographing mechanism.

In the object detecting system of a third embodiment, the light emitting mechanism includes a first light emitting section and a second light emitting section. The first light emitting section emits light to be incident on a central portion of an aperture area of an objective lens of the optical lens. The second light emitting section emits light to be incident on a peripheral portion of the aperture area of the objective lens such that the quantity of light emitted from the second light emitting section is larger than the quantity of light emitted from the first light emitting section. The aperture area of the objective lens is an area, on which light is incident, of a lens (objective lens) which is nearest to the object to be detected among a plurality of lenses composing the optical lens. Accordingly, the quantity of light focused on the distance measuring image chip through the peripheral portion of the aperture area of the objective lens is increased, thereby improving the accuracy of detection of the object to be detected by the portion corresponding to the peripheral portion of the focusing area.

As mentioned above, there may be issues specific to optical lens such that the quantity of light focused into the focusing area of the distance measuring image chip through the optical lens is reduced at the peripheral portion and the distortion of image focused into the focusing area of the distance measuring image chip is increased at the peripheral portion as compared to the central portion. The issues can become significant as the viewing angle of the camera is increased. According to the structure of the object detecting system of the embodiment, the issues can be solved by the arrangement of the first light emitting section and the second light emitting section.

In the object detecting system of a fourth embodiment, the processing mechanism is adapted to derive information about position, information about distance, and information about motion as the information about the object. In addition, the control mechanism controls to changes the light emitting modes of the light emitting sections based on at least one of the information about position, the information about distance, and the information about motion derived by the processing mechanism.

Therefore, according to the aforementioned structure of the object detecting system of the fourth embodiment, the accuracy of calculation of the light quantity and the light emitting pattern of the light emitting sections can be improved by controlling the light emitting modes of the light emitting sections to be changed based on the information about position, the information about distance, and/or the information about motion of the object.

In the object detecting system of a fifth embodiment, the light emitting mechanism includes a driver-seat-side light emitting section, a front-passenger-seat-side light emitting section, and a rear-seat-side light emitting section. The driver-seat-side light emitting section is a light emitting section which emits light toward an object on a driver seat. The front-passenger-seat-side light emitting section is a light emitting section which emits light toward an object on a front passenger seat. The rear-seat-side light emitting section is a light emitting section which emits light toward an object on a rear seat.

According to the aforementioned structure of the object detecting system of the fifth embodiment, illuminants are arranged only at locations requiring light distribution, thereby enabling miniaturization of illuminating part. In addition, the illumination device can conduct light distribution of high directivity relative to objects occupying the respective vehicle seat and is thus reasonable.

In the object detecting system of a sixth embodiment, the control mechanism, based on information about an object occupying any of the vehicle seats, changes the light emitting mode of the light emitting section corresponding to the object. The presence of the object on each of the vehicle seats may be detected by the photographing mechanism or a seat sensor.

According to the aforementioned structure of the object detecting system of the sixth embodiment, only when an object occupying a vehicle seat is detected, the illuminant corresponding to the object is controlled to be actuated. According to this control, it is not necessary to emit light toward a vehicle seat without any object, thereby reducing electric power consumption and improving the durability of the illuminants (light emitting lamps). As for the improvement of the durability, high effect can be obtained at the illuminants (light emitting lamps) corresponding to the front passenger seat and the rear seat because these are less frequently used than that corresponding to the driver seat.

The operation device control system of a seventh embodiment comprises an object detecting system, an operation device which is operated based on the information about the object occupying the vehicle seat derived by the processing mechanism of the object detecting system and an actuation control mechanism for controlling the actuation of the operation device. The operation device of the embodiment includes a warning device for outputting warning signals and an occupant restraining device for restraining a vehicle occupant by an airbag and/or a seat belt.

Therefore, according to the structure of the operation device control system of the seventh embodiment, the operation device can be controlled to be actuated in a suitable mode according to detection results about the object derived by the processing mechanism of the object detecting system, thereby enabling detailed control for the operation device.

The vehicle of an eighth embodiment, comprises an engine/running system, an electrical system, an actuation control device, and an object detecting mechanism. The engine/running system is a system involving an engine and a running mechanism of the vehicle. The electrical system is a system involving electrical parts used in the vehicle. The actuation control device is a device having a function of conducting the actuation control of the engine/running system and the electrical system. The object detecting mechanism is a mechanism for detecting information about an object occupying a vehicle seat. In this embodiment, the object detecting mechanism comprises an object detecting system such as described in one of the above embodiments.

According to this arrangement, there is provided a vehicle mounted with an object detecting system in which information about an object occupying a vehicle seat can be precisely detected by a photographing mechanism.

As described above, the embodiment relate to a structure for detecting information about an object occupying a vehicle seat by a photographing mechanism comprising an optical lens and a distance measuring image chip and a light emitting mechanism. Particularly, the light emitting mechanism for emitting light toward the object occupying the vehicle seat is sectioned into a plurality of light emitting sections of which light emitting modes are controlled individually, thereby precisely detecting information about the object occupying the vehicle seat.

Hereinafter, description will be made with regard to an embodiment of an object detecting system 100 (object detecting mechanism) with reference to FIG. 1(*a*) through FIG. 5.

The structure of the object detecting system 100, which is installed in a vehicle, of this embodiment is shown in FIG. 1(*a*).

The object detecting system 100 of this embodiment is constructed as a system for detecting information about an object such as a vehicle occupant in a vehicle compartment of an automobile. As shown in FIG. 1(*a*), the object detecting system 100 comprises a photographing device 110, an illumination device 130, and a control/computing unit 155.

Figure 6:
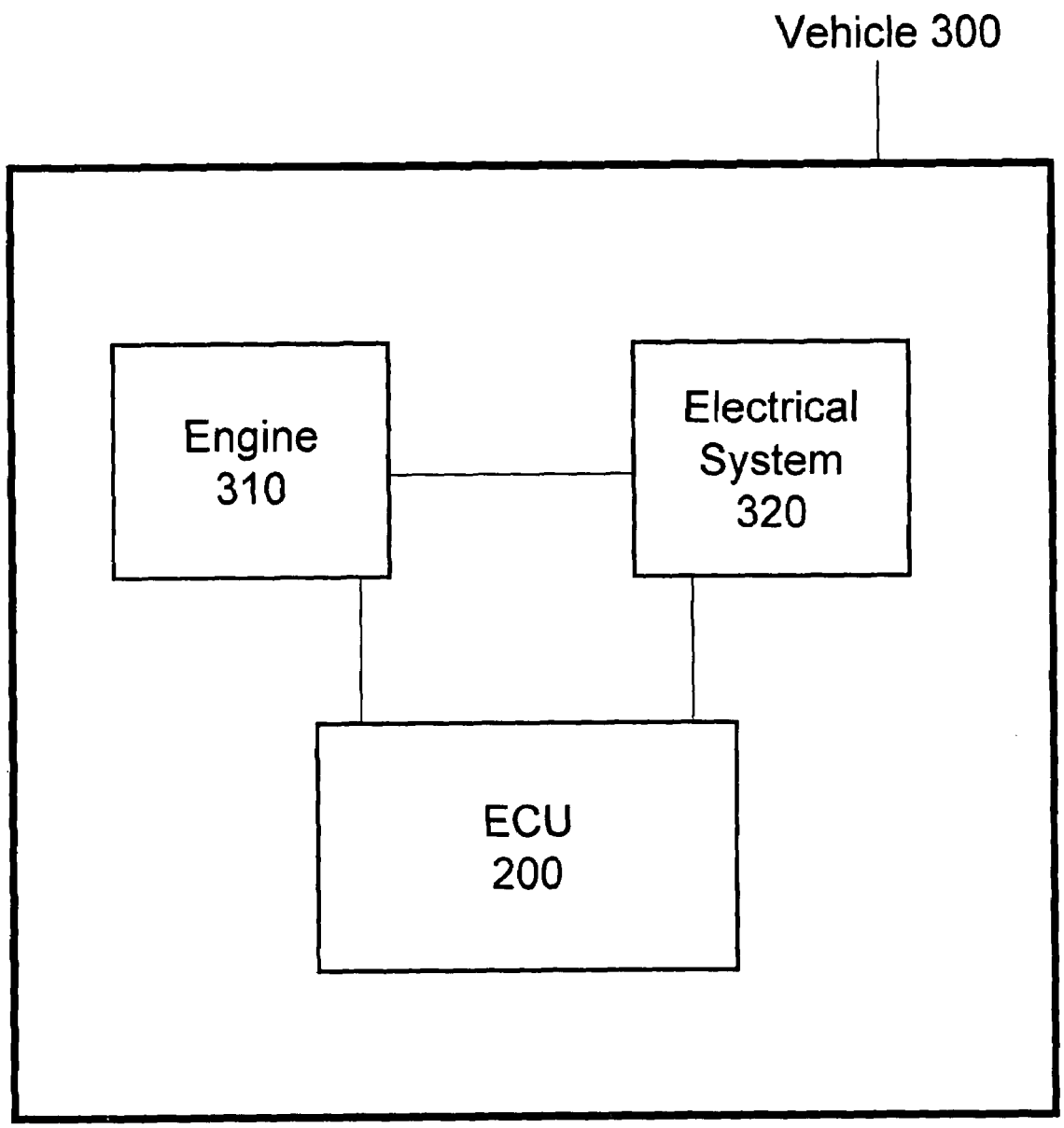
FIG. 6 is an illustration showing components of a vehicle according to an embodiment.

Further, the object detecting system 100 cooperates with an ECU 200 as an actuation control device of the vehicle and an occupant restraining mechanism 210 to compose an occupant restraining apparatus for restraining a vehicle occupant in the event of a vehicle collision. The automobile 300 comprises, (as shown in FIG. 6) an engine/running system 310 involving an engine and a running mechanism of the vehicle, an electrical system 320 involving electrical parts used in the vehicle, and the actuation control device (ECU 200) for conducting the actuation control of the engine/running system and the electrical system.

The photographing device 110 of this embodiment includes a camera 112 as a photographic device and a data transmitting circuit (not shown). The camera 112 is a 3-D (three-dimensional) camera (sometimes called "monitor") of a CCD (charge-coupled device) type in which light sensors are arranged into an array (lattice) arrangement. The camera 112 comprises an optical lens 114 and a distance measuring image chip 116. The optical lens 114 is formed by coupling a plurality of lenses and the distance measuring image chip 116 is a CCD (charge-coupled device) chip in a 3-D camera. In the camera 112, light which is incident on the distance measuring image chip 116 through the optical lens 114 is focused into a focusing region of the distance measuring image chip 116. Information about distances relative to the object is measured by the camera 112 having the aforementioned structure a plurality of times, thereby detecting three-dimensional surface profile which is used for recognition of the presence, size, position, and posture of the object. Information about quantity or brightness of light which is incident on the distance measuring image chip 116 through the optical lens 114 is also detected by the camera 112. As the camera 112, a monocular C-MOS 3-D camera or a pantoscopic stereo 3-D camera may be used.

The camera 112 of this embodiment is placed and embedded in a peripheral portion of an inner rear view mirror, peripheral portions of side mirrors, the ceiling, and/or a center portion in the lateral direction of a dashboard and is arranged to face one or a plurality of passenger seats. By using the camera 112, information about the object occupying a vehicle seat such as a driver seat, a front passenger seat, or a rear passenger seat is measured a plurality of times periodically. The object detecting system 100 of the embodiment is provided with a power source for supplying electric power of a vehicular battery to the camera 112, but not shown. The camera 112 is set to be actuated, for example, when an ignition key is turned on or when a seat sensor (not shown) installed in the driver seat detects a vehicle occupant seated in the driver seat. In FIG. 1(b), an exemplary embodiment is shown in which the object detecting system 100 is embedded in a portion of a dashboard 50 in the vehicle 300.

The illumination device 130 of this embodiment comprises at least a first illuminant 131 and a second illuminant 132, a first driving section 133 and a second driving section 134. The first illuminant 131 is driven by the first driving section 133 and the second illuminant 132 is driven by the second driving section 134. Light emitted from the first illuminant 131 and the second illuminant 132 and reflected by the object C is distributed to the camera 112. The first driving section 133 and the second driving section 134 drive the respective illuminants according to control signals from the control/computing unit 155. The first driving section 133 and the second driving section 134 may be structured as a single driving section. The light emitting mechanism of an embodiment includes the first illuminant 131 and the second illuminant 132. The control mechanism of an embodiment includes the first driving section 133, the second driving section 134, and the control/computing unit 155.

The control/computing unit 155 of this embodiment comprises an image processing mechanism 152, a computing mechanism (MPU: micro processing unit) 154, a storing mechanism 156, an input/output mechanism 158, and a peripheral device (not shown). The control/computing unit 155 is a mechanism for deriving information about the object occupying the vehicle seat based on images obtained by the camera 112. The processing mechanism of an embodiment includes the control computing unit 155.

The image processing mechanism 152 is a mechanism for controlling the camera to obtain good quality images and for controlling the image processing for processing images taken by the camera 112 to be used for analysis. Specifically, as for the control of the camera, the frame rate, the shutter speed, the sensitivity setting, and the accuracy are corrected and the dynamic range, the brightness, and the white balance are adjusted. As for the control of the image processing, the spin compensation for image, the correction for distortion of the lens, the filtering operation, the difference operation as image preprocessing operations are conducted and the configuration determination and the trucking as image recognition processing operations are conducted.

The computing mechanism 154 carries out a process of extracting information about the object based on the information from the image processing mechanism 152. Specifically, information about the presence, size, position, and posture of the object are extracted (derived). When the object is a vehicle occupant, the presence of a vehicle occupant, the size (physique class) of the vehicle occupant, positions of the occupant's head, shoulder, and upper body, and whether the occupant is out-of-position (OOP) are extracted (derived).

The storage mechanism 156 is a mechanism for storing (recording) data for correction, buffer frame memory for preprocessing, defined data for recognition computing, reference patterns, and the computed results of the computing mechanism 154 as well as an operation control software.

The input/output mechanism 158 inputs information about the vehicle, information about traffic conditions around the vehicle, information about weather condition and about time zone, and the like to the ECU 200 for conducting controls of the entire vehicle and outputs recognition results. As the information about the vehicle, there are, for example, the state (open or closed) of a vehicle door, the wearing state of the seat belt, the operation of brakes, the vehicle speed, and the steering angle. In this embodiment, based on the information outputted from the input/output mechanism 158, the ECU 200 outputs actuation control signals to the occupant restraining mechanism 210 as a subject to be actuated. The occupant restraining mechanism 210 may be an apparatus for restraining an occupant such as an airbag and a seat belt. The occupant device of an embodiment includes the occupant restraining mechanism 210. The actuation control mechanism of an embodiment includes the ECU 200 for controlling the actuation of the occupant restraining mechanism 210. In addition to the occupant restraining mechanism 210 or instead of the occupant restraining mechanism 210, the actuation of a warning device for outputting warning signals (display, sound and so on) may be controlled by the ECU 200.

Figure 2:
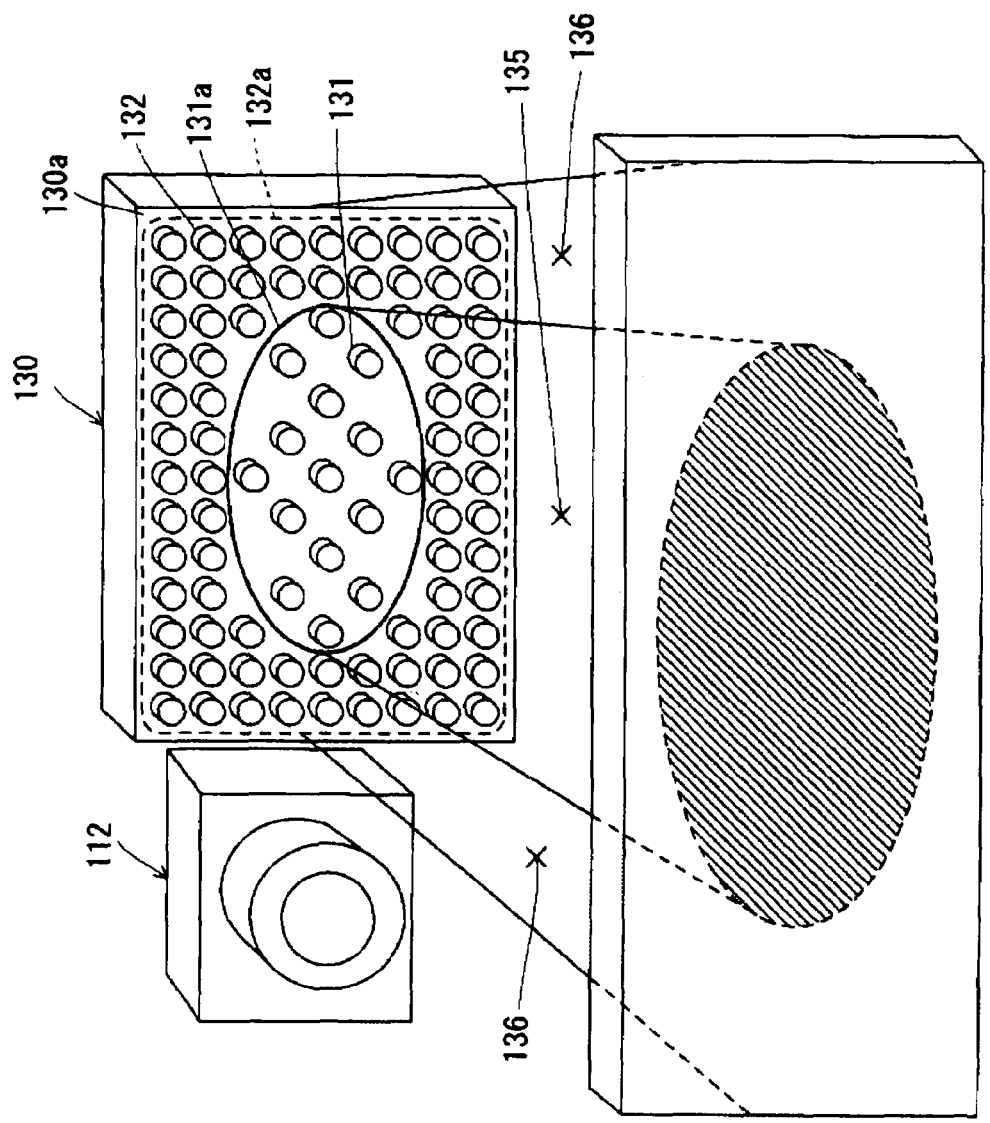
FIG. 2 is an illustration showing a detailed structure of an illumination device as an illumination device of a first embodiment.

The illumination device 130 having the aforementioned structure will be described in detail with reference to FIG. 2. FIG. 2 shows detailed structures of the illumination device 130 of a first embodiment.

As shown in FIG. 2, the illumination device 130 of the first embodiment has a structure in which a large number of light emitting lamps are arranged on a facing surface 130a facing the object. Among the light emitting lamps, a plurality of light emitting lamps arranged in a central area 131a of the facing surface 130a compose the first illuminant 131 and a plurality of light emitting lamps arranged in a peripheral area 132a around the central area 131a compose the second illuminant 132. In this embodiment, the number of light emitting lamps per unit area (the matrix density of light emitting lamps) in the first illuminant 131 is smaller than that (matrix density) of the second illuminant 132. Light emitted from the first illuminant 131 and reflected by an object C is incident on a central area of the distance measuring image chip 116 through a central portion of the aperture area of an objective lens of the optical lens 114 in the camera 112, while light emitted from the second illuminant 132 and reflected by the object C is incident on a peripheral area of the distance measuring image chip 116 (a portion around the central area of the distance measuring image chip 116) through a peripheral portion of the aperture area of the objective lens (a portion around the central portion of the aperture area of the objective lens) of the optical lens 114 in the camera 112. The aperture area of the objective lens is an area allowing incident of light in a lens (objective lens), disposed nearest to the object to be detected, among the plurality of lenses composing the optical lens 114.

In the case of using the camera 112 as used in this embodiment, the quantity of light focused into a focusing area of the distance measuring image chip 116 through the optical lens 114 is decreased at the peripheral area. This phenomenon becomes significant as the viewing angle of the camera 112 is increased. In addition, the distortion of an image focused in the focusing area of the distance measuring image chip 116 is increased at the peripheral area as compared to the central area, thus deteriorating the accuracy of detection of the object. Particularly in the case of using a 3-D camera to detect information about distances relative to a vehicle occupant for the purpose of obtaining detailed information such as the position, posture, and physical size of the vehicle occupant, there must be deterioration and variation in accuracy of detected distances relative to the vehicle occupant so that it is difficult to obtain desired information.

In this embodiment, the plurality of light emitting lamps are sectioned (divided) into two blocks, i.e. the first illuminant 131 and the second illuminant 132, in such a manner that the quantity of incident light (sometimes called "quantity of reflected light") onto the distance measuring image chip 116 is equalized to respective portions in the focusing area and that the first illuminant 131 is made as an illuminant having a relatively small quantity of light (relatively dark illuminant), while the second illuminant 132 is made as an illuminant having a relatively large quantity of light (relatively bright illuminant). Accordingly, the quantity of light of the first illuminant 131 emitting light to be incident on the central portion of the aperture area of the objective lens 114 is restrained relative to the quantity of light of the second illuminant 132 emitting light to be incident on the peripheral portion of the aperture area of the objective lens 114. Specifically, the matrix density of the light emitting lamps of the first illuminant 131 and the matrix density of the light emitting lamps of the second illuminant 132 are set in such a manner that the quantity of light incident on the central area of the distance measuring image chip 116 and the quantity of light incident on the peripheral area of the distance measuring image chip 116 are substantially the same. It should be noted that, as mentioned above, the light emitted from the first illuminant 131 is reflected by the object C, and is then incident on the central area of the distance measuring image chip 116 through the optical lens 114, while light emitted from the second illuminant 132 is reflected by the object C, and is then incident on the peripheral area of the distance measuring image chip 116 through the optical lens 114.

According to the structure as mentioned above of the illumination device 130 of the first embodiment, it is possible to equalize the quantity of incident light onto the distance measuring image chip 116 relative to the respective portions of the focusing area, thereby improving the detection accuracy of the object detected through the camera 112 in a wider area. That is, according to this embodiment, an issue specific to optical lens such that the distance from a detection surface to a peripheral portion is longer than the distance from the detection surface to a central portion as seen in the distance distribution and the quantity of light focused into the focusing area of the distance measuring image chip through the lens is reduced at the peripheral portion as compared to the central portion can be solved by the control of the illumination device 130 (the first illuminant 131 and the second illuminant 132). The improvement of the detection accuracy according to the control allows use of the image chip having lower dynamic range, thereby reducing the cost of the system. Since the matrix density of the light emitting lamps arranged in the central area of the illumination device 130 is set to be lower than that of the peripheral area, the radiation effect of the entire illuminant can be improved and the durability of the illuminant can be improved simultaneously.

Hereinafter, another embodiment of the illumination device 130 of the first embodiment with respect to an arrangement of sectioning (dividing) a large number of light emitting lamps of an illumination device into a plurality of sections will be described with reference to FIG. 3 through FIG. 5.

Figure 3:
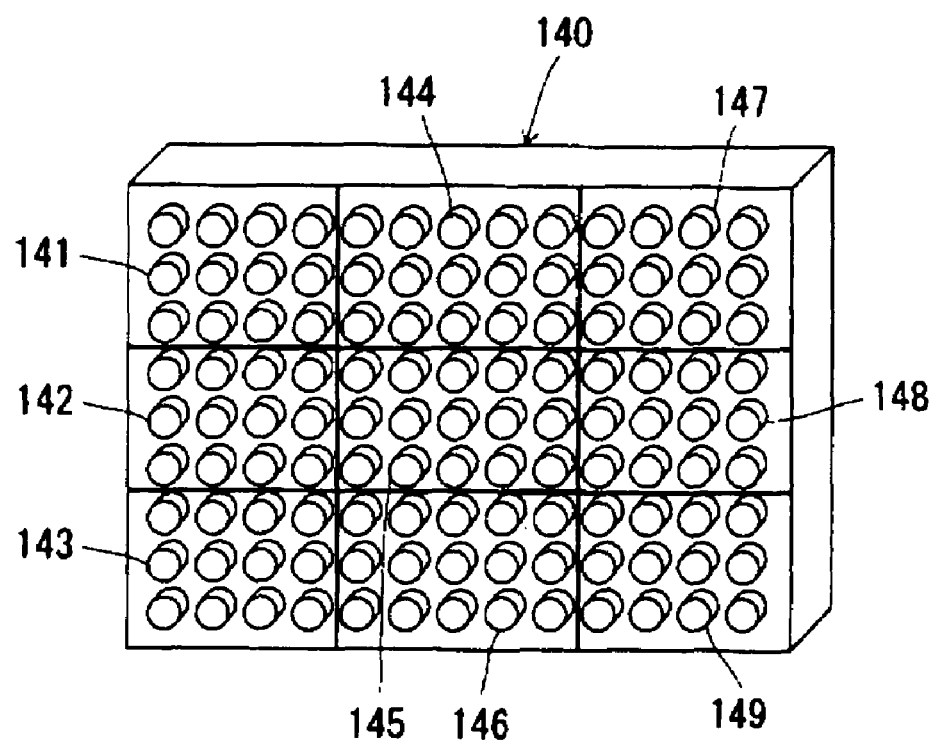
FIG. 3 is an illustration showing a structure of an illumination device of a second embodiment.

FIG. 3 shows an arrangement of an illumination device 140 of a second embodiment. In this illumination device 140, a large number of light emitting lamps are sectioned (divided) into nine illuminants, i.e., a first illuminant 141, a second illuminant 142, a third illuminant 143, a fourth illuminant 144, a fifth illuminant 145, a sixth illuminant 146, a seventh illuminant 147, an eighth illuminant 148, and a ninth illuminant 149. In this embodiment, the respective illuminants, i.e. the first through ninth illuminants 141-149 are set to have the same number of light emitting lamps per unit area (the matrix density of light emitting lamps). Further in the illumination device 140, the light emitting modes (light quantity, light emitting pattern) of the respective illuminants are individually controlled to be changed.

Specific controls for the illumination device 140 having the aforementioned structure will be described with reference to FIG. 4. FIG. 4 shows an illustration for explaining the control for the illumination device 140 of the second embodiment.

Figure 4:
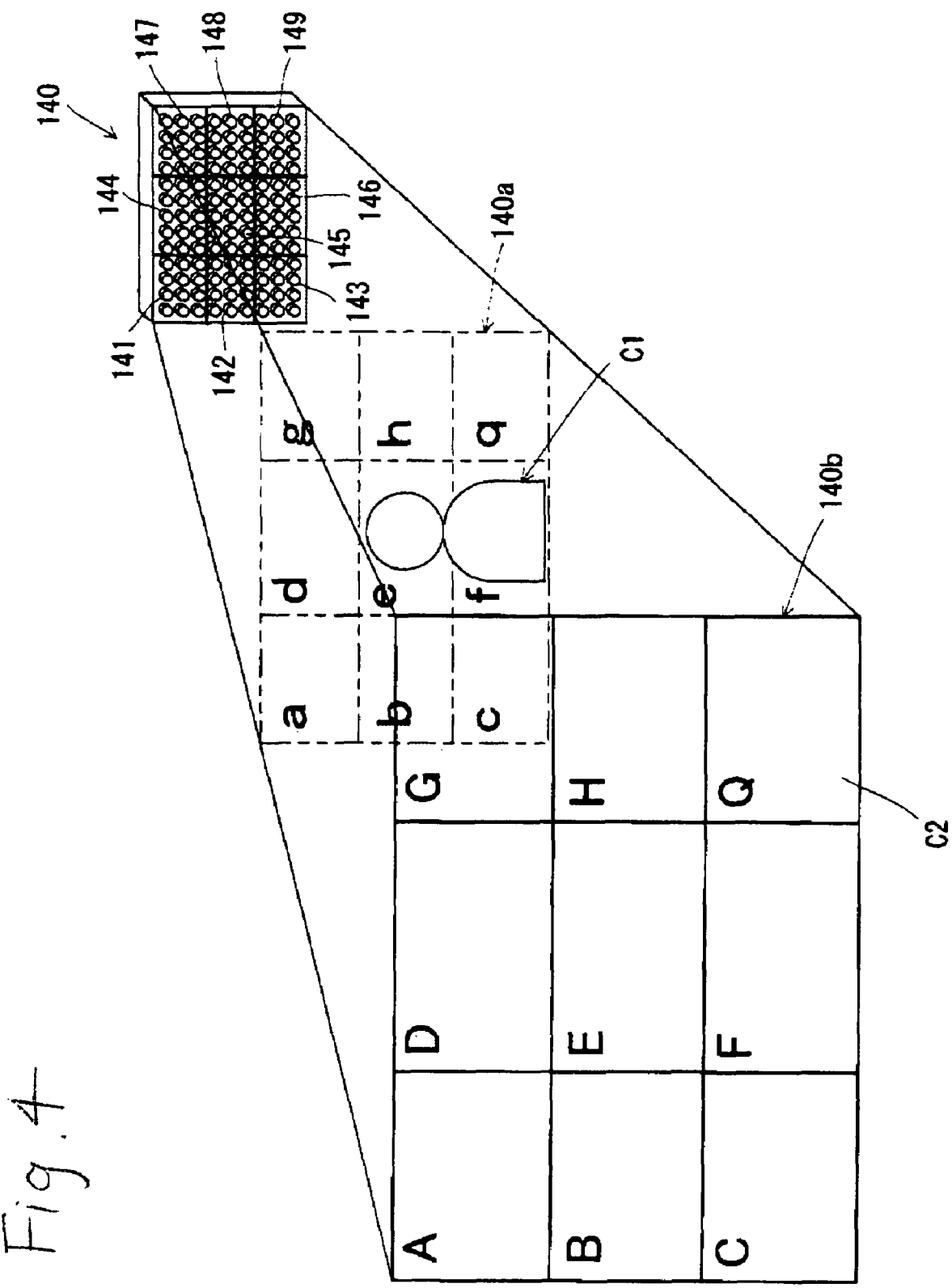
FIG. 4 is an illustration of the control of the illumination device of the second embodiment.

In FIG. 4, the first illuminant 141 of the illumination device 140 emits light to a section "a" of a first region 140a, as one of regions facing the illumination device 140, which is positioned relatively near the illumination device 140 and emits light to a section "A" of a second region 140b, as another one of the regions, which is positioned relatively far from the illumination device 140. The second illuminant 142 emits light to a section "b" of the first region 140a and to a section "B" of the second region 140b. The third illuminant 143 emits light to a section "c" of the first region 140a and to a section "C" of the second region 140b. The fourth illuminant 144 emits light to a section "d" of the first region 140a and to a section "D" of the second region 140b. The fifth illuminant 145 emits light to a section "e" of the first region 140a and to a section "E" of the second region 140b. The sixth illuminant 146 emits light to a section "f" of the first region 140a and to a section "F" of the second region 140b. The seventh illuminant 147 emits light to a section "g" of the first region 140a and to a section "G" of the second region 140b. The eighth illuminant 148 emits light to a section "h" of the first region 140a and to a section "H" of the second region 140b. The ninth illuminant 149 emits light to a section "q" of the first region 140a and to a section "Q" of the second region 140b.

Here, it is assumed that a vehicle occupant C1 (object) occupying a vehicle seat exists at the first region 140a relatively near the illumination device 140 and a rear wall C2 (object) exists at the second region 140b relatively far from the illumination device 140. In this case, based on the information about distance relative to the vehicle occupant C1 detected by the camera 112, the fifth illuminant 145 and the sixth illuminant 146 are controlled to have light quantity smaller than that of the other illuminants so that the vehicle occupant at the first region 140a near the illumination device 140 is illuminated with relatively weak and dark light. On the other hand, based on the information about distance relative to the rear wall C2 detected by the camera 112, the first illuminant 141 through the fourth illuminant 144 and the seventh illuminant 147 through the ninth illuminant 149 are controlled to have light quantity larger than that of the other illuminants so that the rear wall C2 at the second region 140b far from the illumination device 140 is illuminated with relatively strong and bright light. That is, in this embodiment, the light emitting modes of the respective illuminants of the illumination device 140 are controlled to be changed depending on the distance from the illumination device 140 to the object.

According to the structure of the illumination device 140 of the second embodiment, the respective illuminants are controlled to have variable light quantity according to the distances relative to the objects such as an object near and an object far from the illumination device 140, thereby equalizing the quantity of incident light (quantity of reflected light) to the distance measuring image chip 116 of the camera 112. That is, when lights emitted from the respective illuminants and reflected by the objects are incident on the distance measuring image chip 116 through the optical lens 114 of the camera 112, the quantity of light incident on the focusing area of the distance measuring image chip can be equalized to respective portions of the focusing area. Therefore, similarly to the illumination device 130 of the first embodiment, it is possible to improve the accuracy of detection of objects in a wider area. The improvement of the detection accuracy allows use of the image chip having lower dynamic range, thereby reducing the cost of the system.

In this embodiment, the light emitting modes of the illuminants in the illumination device 140 can be controlled to be changed not only based on the information about distances of objects but also based on information about motions of the objects and/or information about positions of the objects. For example, it is assumed that the vehicle occupant C1 existing at the sections "e" and "f" of the first region as shown in FIG. 4 moves to the section "q" of the first region 140a. In this case, before the movement of the vehicle occupant C1, the fifth illuminant 145 and the sixth illuminant 146 are controlled to have light quantity smaller than that of the other illuminants. After the movement of the vehicle occupant C1, the ninth illuminant 149 is controlled to have reduced light quantity which is smaller than the previous light quantity of the ninth illuminant 149 before the movement and the fifth illuminant 145 and the sixth illuminant 146 are controlled to have increased light quantity which is larger than the previous light quantity of these illuminants 145, 146 before the movement.

This control enables light distribution from the illuminants which follows the motion of an object well. For example, for quickly and/or precisely detecting an object, illuminant(s) corresponding to a part that is desired to be detected of the object can be controlled to provide strong light distribution. Therefore, the light emitting modes of the respective illuminants can be variously selected based on the order of precedence of detection, thereby enabling construction of a detecting system having expanded versatility for various algorithms.

Changing the light emitting modes of the light emitting sections based on at least one of the information about position, the information about distance, and the information about motion derived by the processing mechanism can be accomplished by control in the illumination device 140. It should be noted that the light emitting modes of the respective light emitting sections can be controlled to be changed based on a combination of two or more of information about position, information about distances, and information about motion derived by the processing mechanism.

Figure 5:
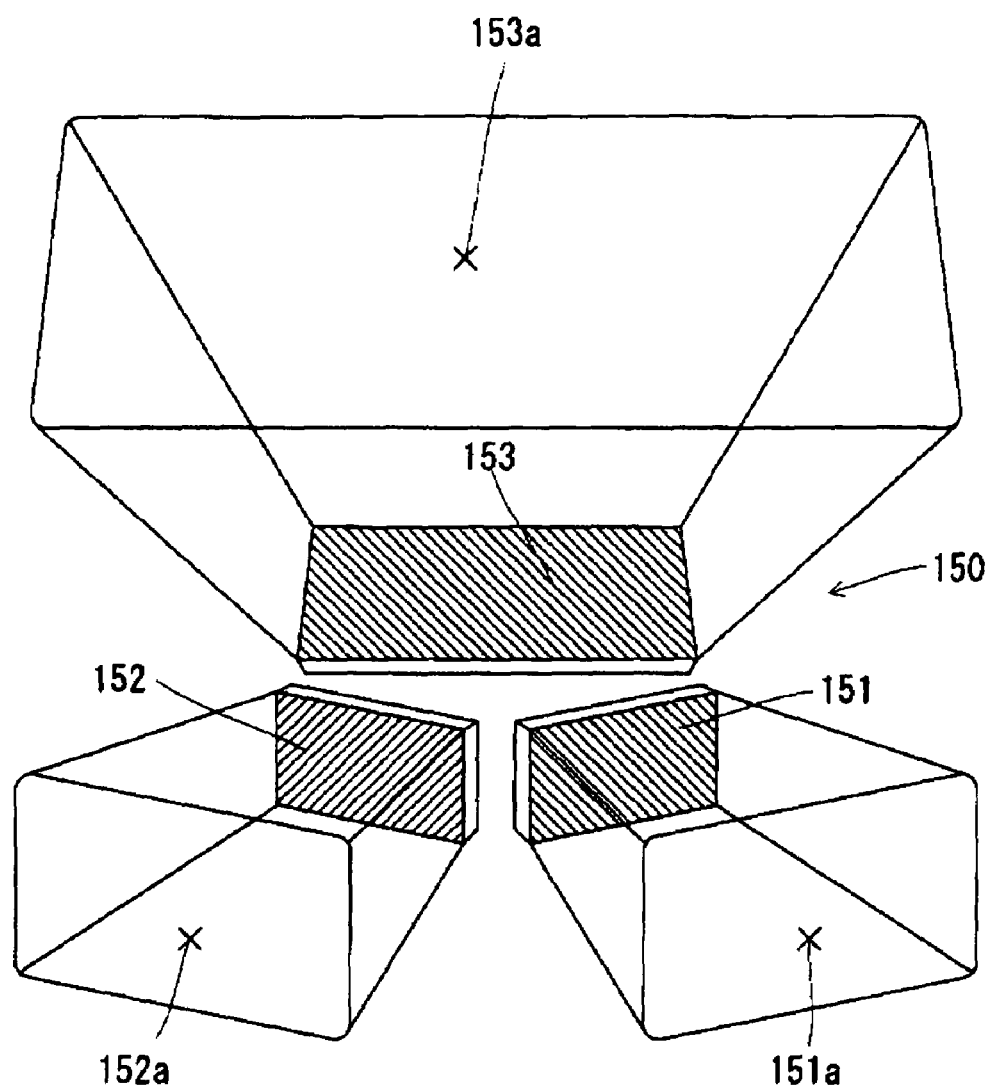
FIG. 5 is an illustration showing a detailed structure of an illumination device of a third embodiment.

FIG. 5 shows an arrangement of an illumination device 150 of a third embodiment. In this illumination device 150, a large number of light emitting lamps are sectioned (divided) into three illuminants, i.e., a first illuminant 151, a second illuminant 152, and a third illuminant 153. In this embodiment, the first illuminant 151 is arranged to face a driver seat region 151a and is thus adapted to distribute light to an object occupying a driver seat. The second illuminant 152 is arranged to face a front passenger seat region 152a and is thus adapted to distribute light to an object occupying a front passenger seat. The third illuminant 153 is arranged to face a rear seat region 153a and is thus adapted to distribute light to an object occupying a rear seat. In the illumination device 150, the light emitting modes (light quantity, light emitting pattern) of the respective illuminants can be controlled to be changed individually.

According to the aforementioned structure of the illumination device 150 of the third embodiment, the illuminants are arranged only at locations requiring light distribution, thereby enabling miniaturization of an illuminating part. In addition, the illumination device can conduct light distribution of high directivity relative to objects occupying the respective vehicle seat and is thus reasonable. The presence of an object, for example, a vehicle occupant on each of the vehicle seats, may be detected by a camera 112 or a seat sensor. In this case, only when an object occupying a vehicle seat is detected, the illuminant corresponding to the object is controlled to be actuated. According to this control, it is not necessary to emit light toward a vehicle seat without any object, thereby reducing electric power consumption and improving the durability of the illuminants (light emitting lamps). As for the improvement of the durability, high effect can be obtained at the illuminants (light emitting lamps) corresponding to the front passenger seat and the rear seat because these are less frequently used than that corresponding to the driver seat.

Figure 1B:
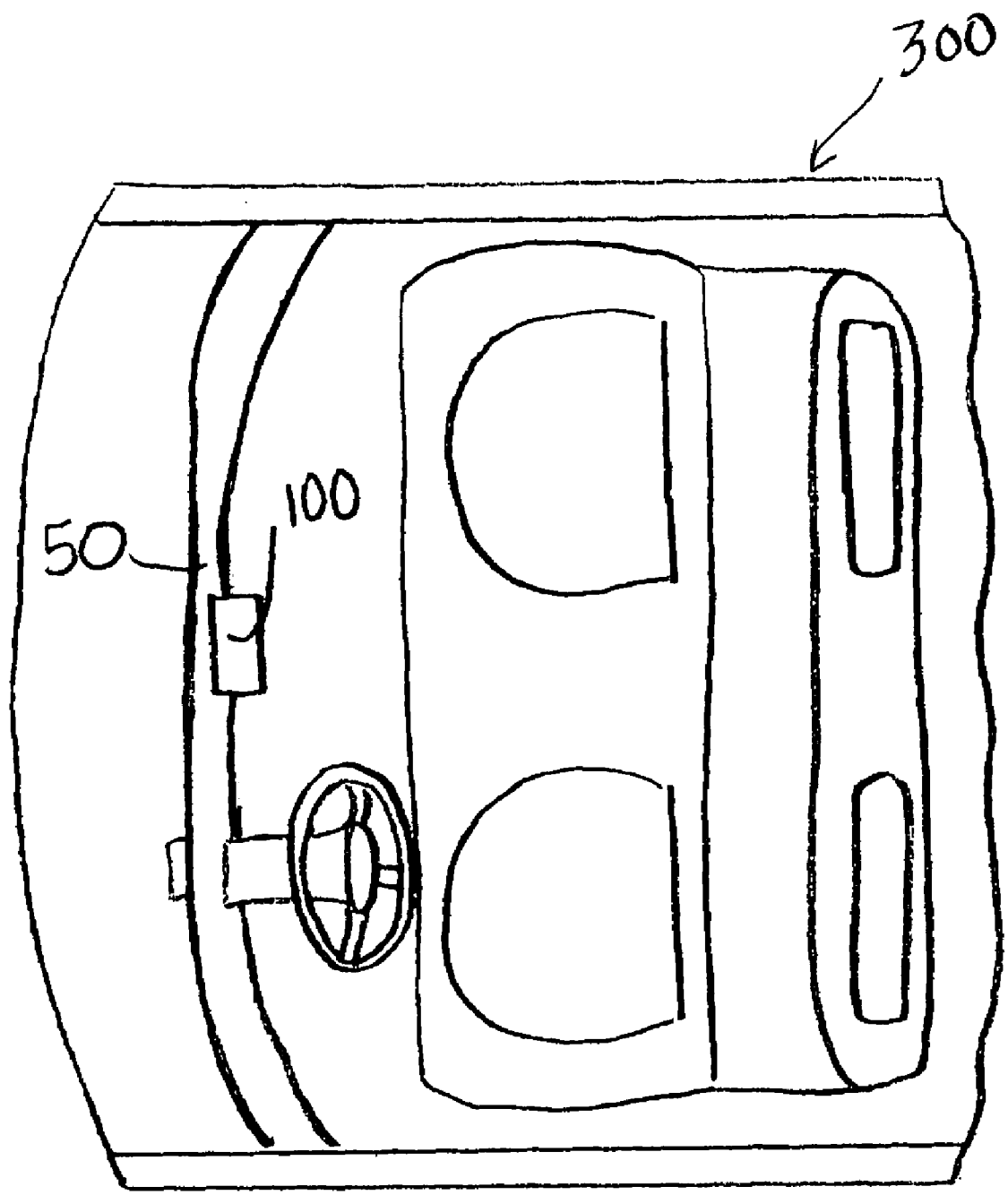
FIG. 1(b) is an illustration showing an interior space of a vehicle and an exemplary location of the object detecting system in the vehicle.

Information detected by the object detecting system 100 having the aforementioned structure is transmitted to the ECU 200 shown in FIG. 1(a) continuously or at regular time intervals so that the ECU 200 control the actuation of the occupant restraining mechanism 210. For example, the restraining performance (occupant restraining mode) by the occupant restraining mechanism 210 such as an airbag device and a seat belt device is altered according to the presence, physical size, position, distance, motion, and posture of a vehicle occupant. Specifically, the restraining performance (occupant restraining mode) can be controlled to be altered by changing the energy absorbing capacity of the airbag and/or the seat belt and/or changing the deployment speed of the airbag.

According to this embodiment, a control of actuating the occupant restraining mechanism 210 only when there is a vehicle occupant on any of the vehicle seats is enabled by detecting the presence of the vehicle occupant on the vehicle seat. Therefore, undesired actuation of the occupant restraining mechanism 210 can be prevented. When the presence of vehicle occupants on front seats and rear seats are detected, a control of urging the occupant(s) not wearing a seat belt to wear the seat belt by the warning device which outputs warning signals (display, sound and so on) may also be conducted.

There may be specific issues with the optical lens such that the quantity of light focused into the focusing area of the distance measuring image chip 116 through the optical lens 114 is reduced at the peripheral portion and the distortion of image focused into the focusing area of the distance measuring image chip 116 is increased at the peripheral portion as compared to the central portion. The issues can become significant as the viewing angle of the camera is increased. However, by using the object detecting system 100 of this embodiment as mentioned above, the issues can be solved, for example, by sectioning (dividing) the illumination device 130 into a plurality of illuminants and individually setting the light emitting modes of the respective illuminants in the illumination device 130 of the first embodiment. Therefore, information about the object occupying the vehicle seat can be detected precisely by using the photographing device 110. The improvement of the detection accuracy allows use of the image chip having lower dynamic range, thereby reducing the cost of the system.

Further, for example, in the illumination device 140 of the second embodiment, the light emitting modes of the respective illuminants of the illumination device 140 are controlled to be changed based on the information about position(s), distance(s), and/or motion(s) of the object(s), thereby improving the calculation accuracy of the light quantity and the light emitting pattern.

Further, for example, in the illumination device 150 of the third embodiment, the first illuminant 151 facing the driver seat region 151a, the second illuminant 152 facing the front passenger seat region 152a, and the third illuminant 153 facing the rear seat region 153a are provided. That is, the illuminants are arranged only at locations requiring light distribution, thereby enabling miniaturization of an illuminating part. In addition, the illumination device can conduct light distribution of high directivity relative to objects occupying the respective vehicle seat and is thus reasonable. In addition, based on information about an object occupying any of the vehicle seats, the light emitting mode of the light emitting section corresponding to the object can be controlled to be changed. According to this control, it is not necessary to emit light toward a vehicle seat without any object, thereby reducing electric power consumption and improving the durability of the illuminants (light emitting lamps).

By using the object detecting system 100 of this embodiment, the occupant restraining mechanism 210 can be controlled to be actuated in a suitable mode according to detection results of the object detecting system, thereby enabling detailed control for the occupant restraining mechanism 210.

According to this embodiment, there is provided a vehicle mounted with the object detecting system 100 capable of precisely detecting information about the object(s) occupying the vehicle seat(s) by using the photographing device 110.

Embodiments are not limited to the aforementioned embodiments and various applications and modifications may be made. For example, the following respective embodiments based on the aforementioned embodiment may be carried out.

An embodiment can employ an illumination device having a combination of two or more of the functions of the illumination device 130 of the first embodiment, the illumination device 140 of the second embodiment, and the illumination device 150 of the third embodiment.

An embodiment, the object to be detected through the camera 112 includes a vehicle occupant, an object placed on a vehicle seat, a child seat, and a junior seat. In this case, information about the object includes information about presence, size, position, distances, posture, motion of the object, and light emitting quantity (light distribution amount) and brightness relative to the object.

Though the aforementioned embodiment has been described with regard to the arrangement of the object detecting system to be installed in an automobile, embodiments can be adopted to object detecting systems to be installed in various vehicles other than automobile such as an airplane, a boat, a train, a bus, a truck, and the like.

The Japanese Priority Application 2006-036760, filed Feb. 14, 2006 including the specification, drawings, claims and abstract, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An object detecting system comprising:
    a light emitting mechanism which emits light toward an object occupying a vehicle seat and which is sectioned into a plurality of light emitting sections, wherein the light emitting sections have light emitting modes that are individually controlled;
    a control mechanism to control the light emitting mechanism;
    a photographing mechanism including an optical lens and a distance measuring image chip, wherein light emitted from the light emitting mechanism and reflected by the object is incident on the distance measuring image chip through the optical lens and is focused into a focusing area of the distance measuring image chip; and
    a processing mechanism to derive information about the object from a focused image on the distance measuring image chip of the photographing mechanism,
    wherein the light emitting modes of respective light emitting sections are each controlled such that incident light on the distance measuring image chip is equalized on a respective portion of the focusing area corresponding to the respective light emitting section.

2. The object detecting system as claimed in claim 1, wherein the light emitting modes of the respective light emitting sections in the light emitting mechanism are each controlled such that quantity of incident light on the distance measuring image chip is equalized to the respective portion of the focusing area corresponding to the respective light emitting section.

3. The object detecting system as claimed in claim 2, wherein the light emitting mechanism includes a first light emitting section which emits a quantity of light to be incident on a central portion of an aperture area of an objective lens of the optical lens and a second light emitting section which emits a quantity of light to be incident on a peripheral portion of the aperture area of the objective lens such that the quantity of light emitted from the second light emitting section is larger than the quantity of light emitted from the first light emitting section.

4. The object detecting system as claimed in claim 1, wherein the processing mechanism is adapted to derive information about position, information about distance, and information about motion as the information about the object, and
wherein the control mechanism changes the light emitting modes of the light emitting sections based on at least one of the information about position, the information about distance, and the information about motion derived by the processing mechanism.

5. An object detecting system comprising:
a light emitting mechanism which emits light toward an object occupying a vehicle seat and which is sectioned into a plurality of light emitting sections, wherein the light emitting sections have light emitting modes that are individually controlled;
a control mechanism to control the light emitting mechanism;
a photographing mechanism including an optical lens and a distance measuring image chip, wherein light emitted from the light emitting mechanism and reflected by the object is incident on the distance measuring image chip through the optical lens and is focused into a focusing area of the distance measuring image chip; and
a processing mechanism to derive information about the object from a focused image on the distance measuring image chip of the photographing mechanism,
wherein the light emitting mechanism includes a driver-seat-side light emitting section which emits light toward an object on a driver seat, a front-passenger-seat-side light emitting section which emits light toward an object on a front passenger seat, and a rear-seat-side light emitting section which emits light toward an object on a rear seat.

6. The object detecting system as claimed in claim 5, wherein the control mechanism, based on information about an object occupying any of the vehicle seats, changes the light emitting mode of the light emitting section corresponding to the object.

7. An operation device control system comprising:
an object detecting system, the object detecting system comprising:
a light emitting mechanism which emits light toward an object occupying a vehicle seat and which is sectioned into a plurality of light emitting sections, wherein the light emitting sections have light emitting modes that are individually controlled;
a control mechanism to control the light emitting mechanism;
a photographing mechanism including an optical lens and a distance measuring image chip, wherein light emitted from the light emitting mechanism and reflected by the object is incident on the distance measuring image chip through the optical lens and is focused into a focusing area of the distance measuring image chip; and
a processing mechanism to derive information about the object from a focused image on the distance measuring image chip of the photographing mechanism;
an operation device which is operated based on the information about the object occupying the vehicle seat derived by the processing mechanism of the object detecting system; and
an actuation control mechanism to control the actuation of the operation device,
wherein the light emitting modes of respective light emitting sections are each controlled such that incident light on the distance measuring image chip is equalized on a respective portion of the focusing area corresponding to the respective light emitting section.

8. The control system as claimed in claim 7, wherein the light emitting modes of the respective light emitting sections in the light emitting mechanism are each controlled such that quantity of incident light on the distance measuring image chip is equalized to the respective portion of the focusing area corresponding to the respective light emitting section.

9. The control system as claimed in claim 8, wherein the light emitting mechanism includes a first light emitting section which emits a quantity of light to be incident on a central portion of an aperture area of an objective lens of the optical lens and a second light emitting section which emits a quantity of light to be incident on a peripheral portion of the aperture area of the objective lens such that the quantity of light emitted from the second light emitting section is larger than the quantity of light emitted from the first light emitting section.

10. The control system as claimed in claim 7, wherein the processing mechanism is adapted to derive information about position, information about distance, and information about motion as the information about the object, and
wherein the control mechanism changes the light emitting modes of the light emitting sections based on at least one of the information about position, the information about distance, and the information about motion derived by the processing mechanism.

11. An operation device control system comprising:
an object detecting system, the object detecting system comprising:
a light emitting mechanism which emits light toward an object occupying a vehicle seat and which is sectioned into a plurality of light emitting sections, wherein the light emitting sections have light emitting modes that are individually controlled;
a control mechanism to control the light emitting mechanism;
a photographing mechanism including an optical lens and a distance measuring image chip, wherein light emitted from the light emitting mechanism and reflected by the object is incident on the distance measuring image chip through the optical lens and is focused into a focusing area of the distance measuring image chip; and
a processing mechanism to derive information about the object from a focused image on the distance measuring image chip of the photographing mechanism;
an operation device which is operated based on the information about the object occupying the vehicle seat derived by the processing mechanism of the object detecting system; and
an actuation control mechanism to control the actuation of the operation device,
wherein the light emitting mechanism includes a driver-seat-side light emitting section which emits light toward an object on a driver seat, a front-passenger-seat-side light emitting section which emits light toward an object on a front passenger seat, and a rear-seat-side light emitting section which emits light toward an object on a rear seat.

12. The control system as claims in claim 11, wherein the control mechanism, based on information about an object occupying any of the vehicle seats, changes the light emitting mode of the light emitting section corresponding to the object.

13. A vehicle comprising:
an engine/running system;

an electrical system;

an actuation control device for conducting the actuation control of the engine/running system and the electrical system; and an object detecting mechanism for detecting information about an object occupying a vehicle seat, wherein the object detecting mechanism comprises an object detecting system including:

a light emitting mechanism which emits light toward the object occupying the vehicle seat and which is sectioned into a plurality of light emitting sections, wherein the light emitting sections have light emitting modes that are individually controlled;

a control mechanism to control the light emitting mechanism;

a photographing mechanism including an optical lens and a distance measuring image chip, wherein light emitted from the light emitting mechanism and reflected by the object is incident on the distance measuring image chip through the optical lens and is focused into a focusing area of the distance measuring image chip; and a processing mechanism to derive information about the object from a focused image on the distance measuring image chip of the photographing mechanism, and wherein the light emitting modes of respective light emitting sections are each controlled such that incident light on the distance measuring image chip is equalized on a respective portion of the focusing area corresponding to the respective light emitting section.

14. The vehicle as claimed in claim 13, wherein the light emitting modes of the respective light emitting sections in the light emitting mechanism are each controlled such that quantity of incident light on the distance measuring image chip is equalized to the respective portion of the focusing area corresponding to the respective light emitting section.

15. The vehicle as claimed in claim 14, wherein the light emitting mechanism includes a first light emitting section which emits a quantity of light to be incident on a central portion of an aperture area of an objective lens of the optical lens and a second light emitting section which emits a quantity of light to be incident on a peripheral portion of the aperture area of the objective lens such that the quantity of light emitted from the second light emitting section is larger than the quantity of light emitted from the first light emitting section.

16. The vehicle as claimed in claim 13, wherein the processing mechanism is adapted to derive information about position, information about distance, and information about motion as the information about the object, and wherein the control mechanism changes the light emitting modes of the light emitting sections based on at least one of the information about position, the information about distance, and the information about motion derived by the processing mechanism.

17. A vehicle comprising:

an engine/running system;

an electrical system;

an actuation control device for conducting the actuation control of the engine/running system and the electrical system; and an object detecting mechanism for detecting information about an object occupying a vehicle seat, wherein the object detecting mechanism comprises an object detecting system including:

a light emitting mechanism which emits light toward the object occupying the vehicle seat and which is sectioned into a plurality of light emitting sections, wherein the light emitting sections have light emitting modes that are individually controlled;

a control mechanism to control the light emitting mechanism;

a photographing mechanism including an optical lens and a distance measuring image chip, wherein light emitted from the light emitting mechanism and reflected by the object is incident on the distance measuring image chip through the optical lens and is focused into a focusing area of the distance measuring image chip; and a processing mechanism to derive information about the object from a focused image on the distance measuring image chip of the photographing mechanism, wherein the light emitting mechanism includes a driver-seat-side light emitting section which emits light toward an object on a driver seat, a front-passenger-seat-side light emitting section which emits light toward an object on a front passenger seat, and a rear-seat-side light emitting section which emits light toward an object on a rear seat.

18. The vehicle as claimed in claim 17, wherein the control mechanism, based on information about an object occupying any of the vehicle seats, changes the light emitting mode of the light emitting section corresponding to the object.

* * * * *